(12) United States Patent
Kim et al.

(10) Patent No.: US 8,059,609 B2
(45) Date of Patent: Nov. 15, 2011

(54) RESOURCE ALLOCATION TO SUPPORT SINGLE-USER AND MULTI-USER MIMO TRANSMISSION

(75) Inventors: Byoung-Hoon Kim, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 818 days.

(21) Appl. No.: 11/686,950

(22) Filed: Mar. 15, 2007

(65) Prior Publication Data

US 2007/0223422 A1    Sep. 27, 2007

Related U.S. Application Data

(60) Provisional application No. 60/784,838, filed on Mar. 20, 2006, provisional application No. 60/785,687, filed on Mar. 24, 2006.

(51) Int. Cl.
*H04W 4/00*    (2009.01)
(52) U.S. Cl. ......... 370/334; 455/450; 370/349; 370/335
(58) Field of Classification Search .................. 370/349, 370/335
See application file for complete search history.

(56) References Cited

U.S. PATENT DOCUMENTS

| | | | |
|---|---|---|---|
| 6,317,466 B1 | 11/2001 | Foschini et al. | |
| 6,473,467 B1 | 10/2002 | Wallace et al. | |
| 6,662,024 B2 | 12/2003 | Walton et al. | |
| 7,047,016 B2 | 5/2006 | Walton et al. | |
| 2004/0001429 A1* | 1/2004 | Ma et al. ...................... 370/210 |
| 2004/0085934 A1* | 5/2004 | Balachandran et al. ...... 370/335 |
| 2004/0136349 A1 | 7/2004 | Walton et al. | |
| 2005/0289434 A1* | 12/2005 | Kim ............................. 714/755 |

(Continued)

FOREIGN PATENT DOCUMENTS

CN    1717888 A    1/2006

(Continued)

OTHER PUBLICATIONS

Ajib W et al., "An Overview of Scheduling Algorithms in MIMO-Based Fourth-Generation Wireless Systems," IEEE Network; IEEE Service Center, vol. 19; No. 5, Sep. 2005, pp. 43-49; XP011139504.

(Continued)

*Primary Examiner* — Kamran Afshar
*Assistant Examiner* — Edward Zhang
(74) *Attorney, Agent, or Firm* — Peng Zhu; Kenyon S. Jenckes

(57) ABSTRACT

Techniques for supporting MIMO transmission are described. Users are classified into a first group of users to be scheduled individually for MIMO transmission and a second group of users that can be scheduled together for MIMO transmission. Transmission resources are allocated to the first and second groups, e.g., based upon various criteria such as the number of users in each group, data requirements of the users, total loading for each group, etc. The transmission resources may be hybrid automatic retransmission (HARQ) interlaces, frequency channels, time frequency resources, etc. The resource allocation may be semi-static. The transmission resources allocated to each group are used for data transmission on the downlink and/or uplink for the users in the group. HARQ with blanking may be used for data transmission for the users in the first group. HARQ without blanking may be used for data transmission for the users in the second group.

32 Claims, 11 Drawing Sheets

U.S. PATENT DOCUMENTS

| | | | | |
|---|---|---|---|---|
| 2006/0098754 A1* | 5/2006 | Kim et al. | .................... | 375/267 |
| 2006/0244630 A1* | 11/2006 | Finkenzeller | ............ | 340/870.07 |
| 2007/0047485 A1* | 3/2007 | Gorokhov et al. | ............ | 370/329 |
| 2007/0066238 A1* | 3/2007 | Zhang et al. | .................... | 455/69 |

FOREIGN PATENT DOCUMENTS

| | | |
|---|---|---|
| JP | 2006504339 | 2/2006 |
| RU | 94028275 | 6/1996 |
| WO | WO2005071864 | 8/2005 |

OTHER PUBLICATIONS

Guangyi Lie et al., "MultipleAccess of MIMO OFDMA: TDMA, FDMA/TDMA, or SDMA/FDMA/TDMA," Communications, 2006 International Conference on Circuits and Systems Proceedings, IEEE, Jun. 2006, pp. 1367-1371, XP031010672.

Haitao Zheng et al., "Multiple ARQ Processes for MIMO Systems," Personal, Indoor and Mobile Radio Communications, 2002. The 13TH IEEE International Symposium on Sep. 15-18, 2002, vol. 3, pp. 1023-1026, XP010611417.

International Search Report-PCT/US07/064334, International Search Authority-European Patent Office, Jul. 27, 2007.

Written Opinion—PCT/US07/064334, International Searching Authority—European Patent Office, Jul. 27, 2007.

Taiwanese Search report-096109611—TIPO—Dec. 29, 2010.

Catt, Ritt, Views on the High Level Principles of MIMO for unicast traffic in E-UTRA downlink, 3GPP TSG RAN WG1 Meeting #44 R1-060521, Feb. 13, 2006, pp. 1-8.

* cited by examiner

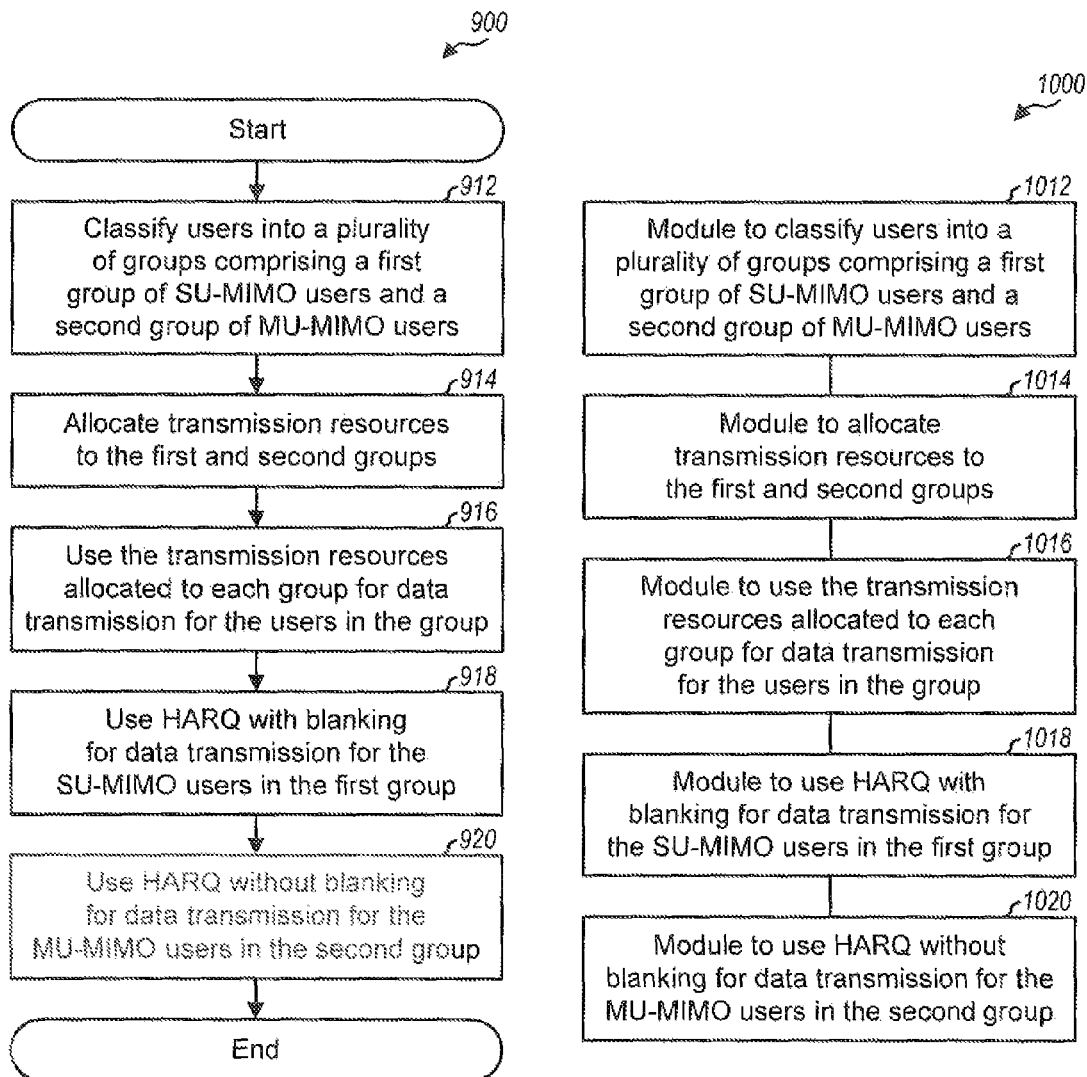

RESOURCE ALLOCATION TO SUPPORT SINGLE-USER AND MULTI-USER MIMO TRANSMISSION

The present application claims priority to provisional U.S. application Ser. No. 60/784,838, filed Mar. 20, 2006, and Ser. No. 60/785,687, filed Mar. 24, 2006, both entitled "Method and System for Resource Grouping to Support the Coexistence of Single-User MIMO and SDMA," assigned to the assignee hereof and incorporated herein by reference.

BACKGROUND

I. Field

The present disclosure relates generally to communication, and more specifically to techniques for transmitting data in a wireless communication system.

II. Background

Wireless communication systems are widely deployed to provide various communication services such as voice, packet data, broadcast, messaging, etc. These systems may be multiple-access systems capable of supporting communication for multiple users by sharing the available system resources, e.g., bandwidth and transmit power. Examples of such multiple-access systems include Code Division Multiple Access (CDMA) systems, Time Division Multiple Access (TDMA) systems, Frequency Division Multiple Access (FDMA) systems, and Orthogonal FDMA (OFDMA) systems.

A wireless multiple-access system includes Node Bs (or base stations) that can communicate with user equipments (UEs). Each UE may communicate with one or more Node Bs via transmissions on the downlink and uplink. The downlink (or forward link) refers to the communication link from the Node Bs to the UEs, and the uplink (or reverse link) refers to the communication link from the UEs to the Node Bs.

A wireless multiple-access system may support multiple-input multiple-output (MIMO) transmission on the downlink and/or uplink. On the downlink, a Node B may send a MIMO transmission from multiple (T) transmit antennas at the Node B to multiple (R) receive antennas at one or more UEs. A MIMO channel formed by the T transmit and R receive antennas may be decomposed into C spatial channels, where $C \leq \min\{R, R\}$. Each of the C spatial channels corresponds to a dimension. Improved performance (e.g., higher throughput and/or greater reliability) may be achieved by exploiting the additional dimensionalities created by the multiple transmit and receive antennas.

There is therefore a need in the art for techniques to efficiently support MIMO transmission in a wireless multiple-access system.

SUMMARY

Techniques to support MIMO transmission to a single user as well as to multiple users are described herein. The terms "user" and "UE" are used interchangeably herein. In one aspect, users are classified into a plurality of groups comprising a first group and a second group. The first group may include users to be scheduled individually for MIMO transmission. The second group may include users that can be scheduled together for MIMO transmission. Transmission resources are allocated to the first and second groups. The transmission resources may comprise hybrid automatic retransmission (HARQ) interlaces, frequency channels, time frequency resources, etc. The resource allocation may be based upon various criteria such as the number of users in each group, data requirements of the users, total loading for each group, etc. The resource allocation may be semi-static, and transmission resources may be reallocated whenever operating conditions changes. The transmission resources allocated to each group are used for data transmission on the downlink and/or uplink for the users in the group. In one design, HARQ with blanking is used for data transmission for the users in the first group, and HARQ without blanking is used for data transmission for the users in the second group.

Various aspects and features of the disclosure are described in further detail below.

BRIEF DESCRIPTION OF THE DRAWINGS

FIG. 9 shows a process for allocating transmission resources to groups of users.

FIG. 10 shows an apparatus for allocating transmission resources to groups.

DETAILED DESCRIPTION

The techniques described herein may be used for single-carrier systems as well as multi-carrier systems with multiple subcarriers. The techniques may also be used for data transmission on the downlink as well as the uplink. For clarity, much of the description below is for data transmission on the downlink.

Figure 1:
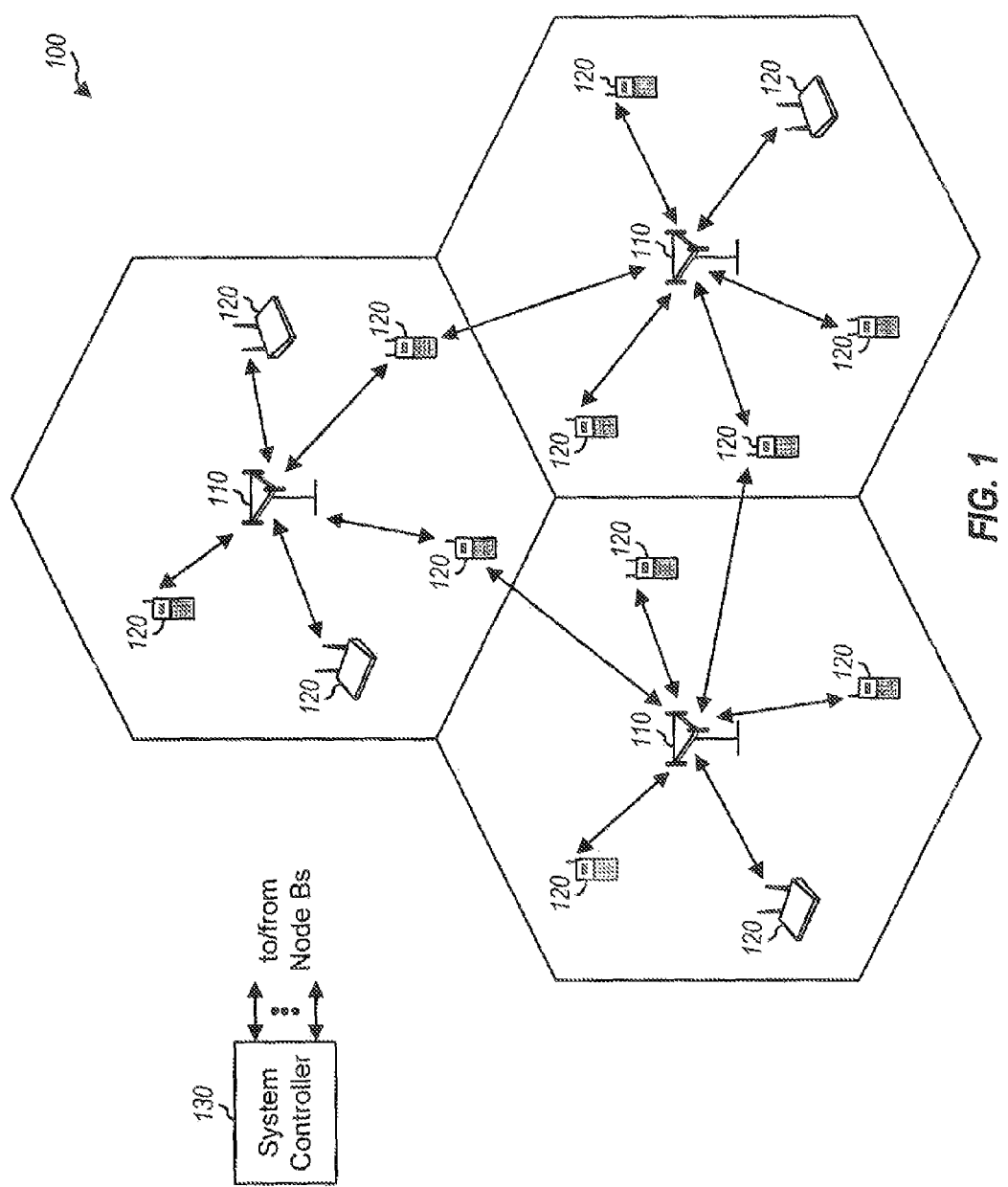
FIG. 1 shows a wireless multiple-access communication system.

FIG. 1 shows a wireless multiple-access communication system 100 with multiple Node Bs 110. A Node B is generally a fixed station that communicates with the UEs and may also be referred to as a base station, an access point, an enhanced Node B (eNode B), etc. Each Node B 110 provides communication coverage for a particular geographic area. The term "cell" can refer to a Node B and/or its coverage area depending on the context in which the term is used. To improve system capacity, a Node B coverage area may be partitioned into multiple smaller areas, e.g., three smaller areas. Each smaller area may be served by a respective base transceiver subsystem (BTS). The term "sector" can refer to a BTS and/or its coverage area depending on the context in which the term is used. For a sectorized cell, the BTSs for all sectors of that cell are typically co-located within the Node B for the cell.

UEs 120 may be dispersed throughout the system. A UE may be stationary or mobile and may also be referred to as a mobile station (MS), a mobile equipment (ME), a terminal, an access terminal (AT), a station (STA), etc. A UE may be a cellular phone, a personal digital assistant (PDA), a wireless modem, a wireless communication device, a subscriber unit, etc.

A system controller 130 may couple to Node Bs 110 and provide coordination and control for these Node Bs. System controller 130 may be a single network entity or a collection of network entities.

Figure 2:
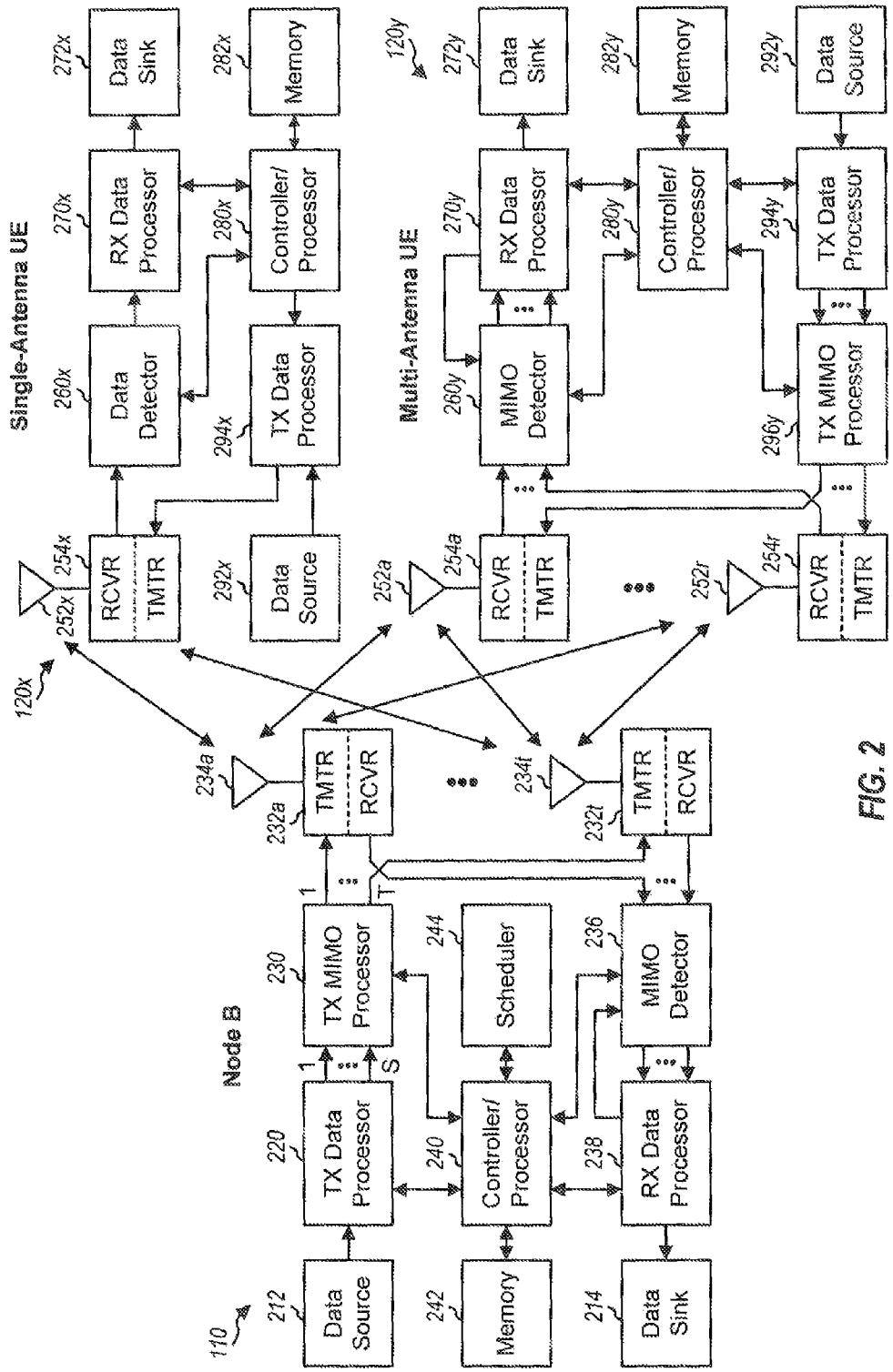
FIG. 2 shows a block diagram of one Node B and two UEs.

FIG. 2 shows a block diagram of one Node B 110 and two UEs 120x and 120y in system 100. Node B 110 is equipped with multiple (T>1) antennas 234a through 234t. UE 120x is equipped with a single (R=1) antenna 252x. UE 120y is equipped with multiple (R>1) antennas 252a through 252r. Each antenna may be a physical antenna or antenna array.

At Node B 110, a transmit (TX) data processor 220 receives traffic data from a data source 212 for one or more UEs being served. Processor 220 processes (e.g., formats, encodes, interleaves, and symbol maps) the traffic data and generates data symbols. Processor 220 also generates and multiplexes pilot symbols with the data symbols. As used herein, a data symbol is a symbol for data, a pilot symbol is a symbol for pilot, and a symbol is typically a complex value. The data symbols and pilot symbols may be modulation symbols from a modulation scheme such as PSK or QAM. Pilot is data that is known a priori by both the Node B and the UEs.

A TX MIMO processor 230 performs transmitter spatial processing on the data and pilot symbols. Processor 230 may perform direct MIMO mapping, precoding, beamforming, etc. A data symbol may be sent from one antenna for direct MIMO mapping or from multiple antennas for precoding and beamforming. Processor 230 provides T output symbol streams to T transmitters (TMTRs) 232a through 232t. Each transmitter 232 may perform modulation (e.g., for OFDM, CDMA, etc.) on its output symbols to obtain output chips. Each transmitter 232 further processes (e.g., converts to analog, filters, amplifies, and upconverts) its output chips and generates a downlink signal. T downlink signals from transmitters 232a through 232t are transmitted from T antennas 234a through 234t, respectively.

At each UE 120, one or multiple antennas 252 receive the downlink signals from Node B 110. Each antenna 252 provides a received signal to a respective receiver (RCVR) 254. Each receiver 254 processes (e.g., filters, amplifies, downconverts, and digitizes) its received signal to obtain samples. Each receiver 254 may also perform demodulation (e.g., for OFDM, CDMA, etc.) on the samples to obtain received symbols.

At single-antenna UE 120x, a data detector 260x performs data detection (e.g., matched filtering or equalization) on the received symbols and provides data symbol estimates. A receive (RX) data processor 270x then processes (e.g., symbol demaps, deinterleaves, and decodes) the data symbol estimates and provides decoded data to a data sink 272x. At multi-antenna UE 120y, a MIMO detector 260y performs MIMO detection on the received symbols and provides data symbol estimates. An RX data processor 270y then processes the data symbol estimates and provides decoded data to a data sink 272y.

UEs 120x and 120y may transmit traffic data and/or feedback information on the uplink to Node B 110. The feedback information may also be referred to as channel state information (CSI), link adaptation information, etc. The feedback information may convey various types of information such as, e.g., a precoding matrix selected from a set of precoding matrices, one or more columns of the selected precoding matrix, a signal-to-noise ratio (SNR) estimate or a rate for each data stream, etc. The Node B may use the feedback information to schedule and transmit data to the UEs.

At each UE 120, traffic data from a data source 292 and feedback information from a controller/processor 280 are processed by a TX data processor 294, further processed by a TX MIMO processor 296 (if applicable), conditioned by one or more transmitters 254, and transmitted via one or more antennas 252. At Node B 110, the uplink signals from UEs 120x and 120y are received by antennas 234a through 234t, processed by receivers 232a through 232t, and further processed by a MIMO detector 236 and an RX data processor 238 to recover the traffic data and feedback information sent by the UEs.

A controller/processor 240 and/or a scheduler 244 may classify UEs into multiple groups and may allocate transmission resources to each group, as described below. Depending on the system designs the transmission resources may be quantified by time, frequency, space, code, transmit power, etc., or any combination thereof. Scheduler 244 also schedules UEs for transmission, e.g., based upon the received feedback information. Controller/processor 240 controls data transmission for (to/from) the scheduled UEs based upon the received feedback information.

Controllers/processors 240, 280x and 280y may also control the operation of various processing units at Node B 110 and UEs 120x and 120y, respectively. Memories 242, 282x and 282y store data and program codes for Node B 110 and UEs 120x and 120y, respectively.

A Node B may support single-input single-output (SISO), single-input multiple-output (SIMO), multiple-input single-output (MISO), and/or multiple-input multiple-output (MIMO) transmissions. Single-input refers to one transmit antenna and multiple-input refers to multiple transmit antennas for data transmission. Single-output refers to one receive antenna and multiple-output refers to multiple receive antennas for data reception. On the downlink, the multiple transmit antennas are at the Node B, the multiple receive antennas may be at one or more UEs. On the uplink, the multiple transmit antennas may be at one or more UEs, and the multiple receive antennas are at the Node B. The Node B may also support space-time transmit diversity (STTD), space-frequency transmit diversity (SFTD), and/or other transmission schemes.

The Node B may support single-user MIMO (SU-MIMO) and multi-user MIMO (MU-MIMO). SU-MIMO refers to MIMO transmission to/from a single UE on a set of transmission resources. MU-MIMO refers to MIMO transmission to/from multiple UEs on the same set of transmission resources. MU-MIMO is also referred to as Spatial Division Multiple Access (SDMA). For each link, the Node B may support SU-MIMO on some transmission resources and may support MU-MIMO on some other transmission resources, as described below.

The UEs may be classified into a SU-MIMO group and a MU-MIMO group. The Node B may serve a single UE in the SU-MIMO group on a set of transmission resources and may simultaneously serve multiple UEs in the MU-MIMO group on a set of transmission resources. The classification of the UEs may be based upon various criteria such as, e.g., the number of antennas at the Node B, the number of antennas at the UEs, the number of UEs, sector loading at the Node B, data requirements of the UEs, long-term channel statistics, etc. In one specific design, the UEs are classified based upon transmit/receive (Tx/Rx) configuration, e.g., as shown in Table 1.

TABLE 1

|  | R = 1 | R = 2 | R = 4 |
|---|---|---|---|
| T = 2 | MU-MIMO | SU-MIMO | SU-MIMO |
| T = 4 | MU-MIMO | MU-MIMO | SU-MIMO |

A T×R configuration means T transmit antennas at the Node B and R receive antennas at a UE. The six configurations in Table 1 may be supported as follows:

2×1 configuration—two UEs are supported, with one data stream per UE,

2×2 configuration—one UE is supported, with two data streams for this UE,

2×4 configuration—one UE is supported, with two data streams for this UE,

4×1 configuration—four UEs are supported, with one data stream per UE,

4×2 configuration—two UEs are supported, with two data streams per UE, and

4×4 configuration—one UE is supported, with four data streams for this UE.

The UEs may also be classified based upon other schemes. The classification may be semi-static and may be updated, e.g., based upon UE population, UE preference, UE requirements, channel conditions, sector loading, etc.

The Node B may send a MIMO transmission to one or more UEs using direct MIMO mapping, precoding, beamforming, etc. With direct MIMO mapping, each data stream is mapped to a different transmit antenna. With precoding, the data streams are multiplied with a precoding matrix and sent on virtual antennas formed with the precoding matrix. The precoding matrix may be a Hadamard matrix, a Fourier matrix, or some other matrix. Each data stream is sent from all T transmit antennas with precoding. Precoding allows the total transmit power for each transmit antenna to be used for data transmission regardless of the number of data streams being sent. Precoding may also include spatial spreading, space-time scrambling, etc. With beamforming, the data streams are multiplied with a beamforming matrix and steered toward specific receive antennas, e.g., at one or more UEs.

For both SU-MIMO and MU-MIMO, a UE may recover its data streams using various MIMO detection techniques such as linear minimum mean square error (MMSE), zero-forcing (ZF), successive interference cancellation (SIC), etc., which are known in the art. For SIC, the UE recovers one data stream at a time, estimates the interference due to each recovered data stream, and cancels the interference prior to recovering the next stream. SIC may improve the SNRs of data streams that are recovered later. For SU-MIMO, a UE may be able to perform SIC for all data streams sent in the MIMO transmission to that UE. For MU-MIMO, a UE may be able to perform SIC for only the data streams sent to that UE. The MU-MIMO is typically unable to recover the data streams sent to other UEs and would not be able to estimate and cancel the interference due to these data streams. The MU-MIMO UE may thus perform (a) MMSE detection to recover its data streams or (b) MMSE detection with SIC (or MMSE-SIC) to suppress the interference from the data streams for that UE and MMSE detection to suppress the interference from the data streams for the other UEs.

The system may support HARQ, which may take the method of chase combining, incremental redundancy, etc. With HARQ, a transmitter sends a transmission for a packet and may send one or more retransmissions until the packet is decoded correctly by a receiver, or the maximum number of retransmissions has been sent, or some other termination condition is encountered. HARQ may improve reliability of data transmission.

Figure 3:
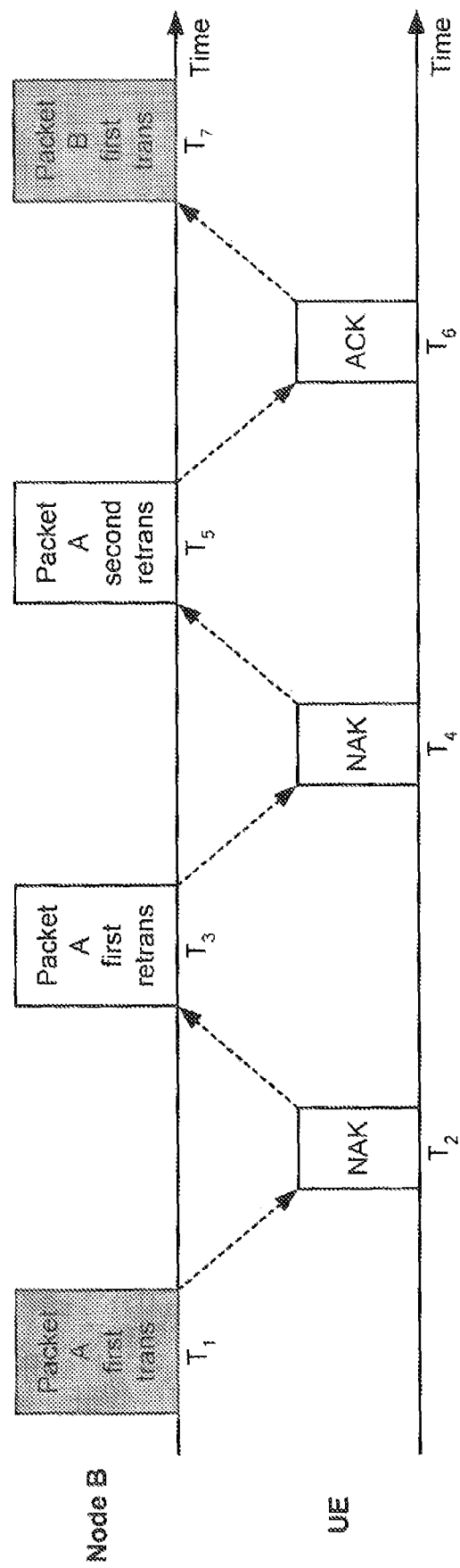
FIG. 3 shows an HARQ transmission on the downlink.

FIG. 3 shows an example HARQ transmission on the downlink. The Node B processes packet A and transmits the packet in transmission time interval (TTI) $T_1$. A TTI may be of any duration and is typically dependent on the system design. For example, a TTI may be 1 millisecond (ms), 2 ms, 5 ms, 10 ms, or some other time duration. A UE receives the transmission, decodes packet A in error, and sends a negative acknowledgment (NAK) in TTI $T_2$. The Node B receives the NAK and retransmits packet A in TTI $T_3$. The UE receives the retransmission, decodes packet A based upon the original transmission and the retransmission, and sends a NAK in TTI $T_4$ when the packet is decoded in error. The Node B receives the NAK and retransmits packet A again in TTI $T_5$. The UE receives the second retransmission, decodes packet A based upon the original transmission and the two retransmissions, and sends an acknowledgement (ACK) in TTI $T_6$ when the packet is decoded correctly. The Node B then processes and transmits the next packet B in similar manner as packet A.

An HARQ process refers to all transmission and retransmissions, if any, for a packet. An HARQ process may be started whenever transmission resources are available and may terminate after the first transmission or after one or more subsequent retransmissions. In FIG. 3, the HARQ process for packet A starts in TTI $T_1$ and terminates in TTI $T_5$. The HARQ process for packet B starts in TTI $T_7$ after termination of the HARQ process for packet A. An HARQ process may have a variable duration that depends on the decoding result at the receiver. Packets may be sent such that their HARQ processes terminate after a target number of retransmissions and with a target packet error rate (PER).

On the downlink, the Node B may send S data streams simultaneously in a MIMO transmission to one or more UEs. S may be given as $1 \leq S \leq \min\{T, R\}$ for SU-MIMO and $1 \leq S \leq T$ for MU-MIMO. The S data streams may be sent using independent HARQ processes. Each packet for each data stream may be sent in one transmission and zero or more retransmissions until the packet is decoded correctly. The termination time may be different for different packets sent on the S data streams. When a data stream has terminated its HARQ process, a new HARQ process may be started either immediately or at a later time when the HARQ processes for all other data streams are terminated.

Figure 4A:
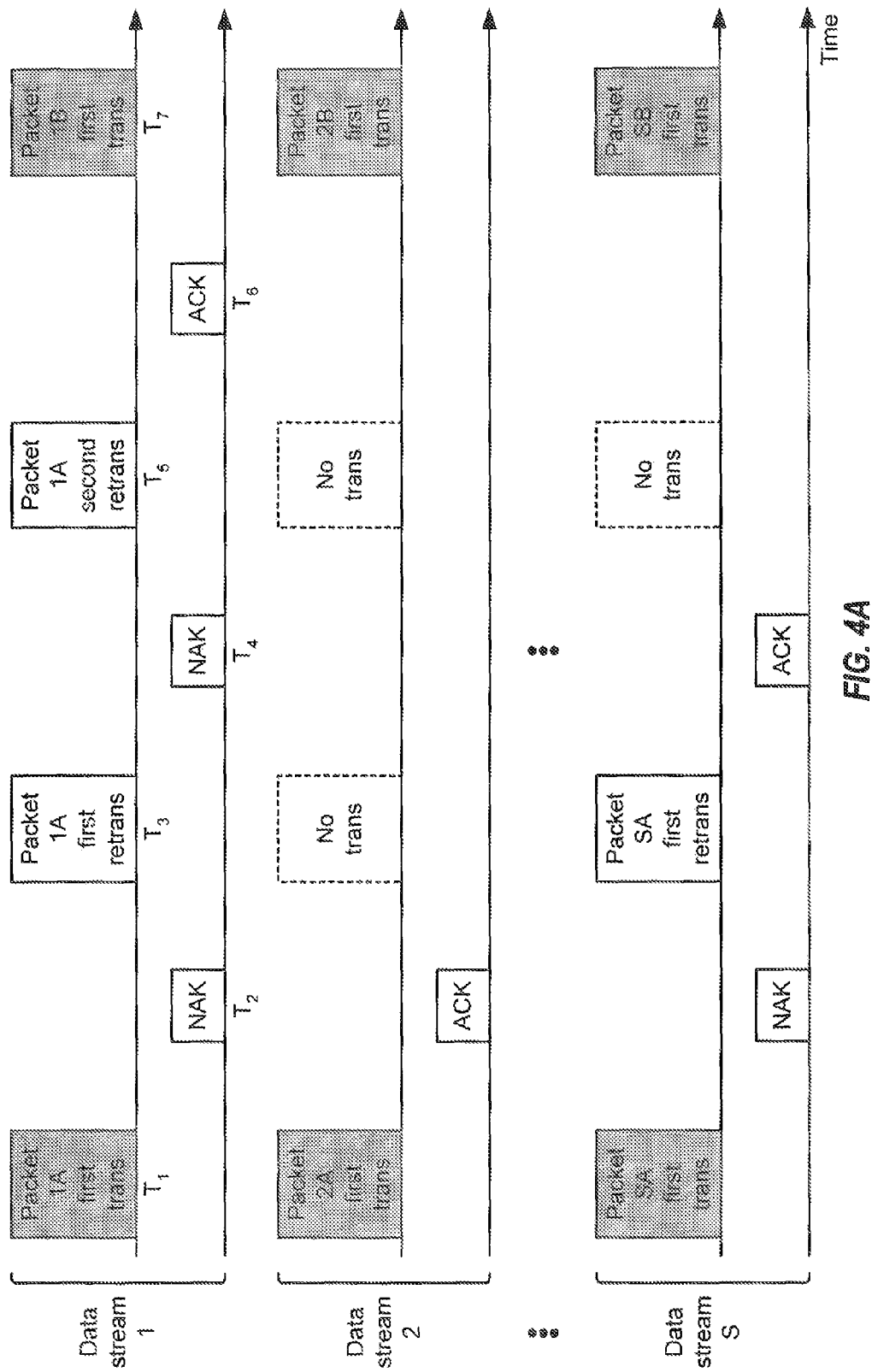
FIG. 4A shows HARQ transmission for multiple data streams with blanking.

FIG. 4A shows an example HARQ transmission for multiple (S>1) data streams with blanking, which is also referred to as blanking strategy. HARQ with blanking refers to a scheme that starts HARQ processes at the same time and waits until all of the HARQ processes terminate before starting new HARQ processes.

In the example shown FIG. 4A, S HARQ processes are started in TTI $T_1$ for S packets 1A through SA for the S data streams. The first transmissions for these S packets are sent in TTI $T_1$. Packet 1A is decoded in error, packet 2A is decoded correctly, and so on, and packet SA is decoded in error. Data stream 2 is then blanked, and no transmissions are sent for data stream 2 until the HARQ processes for all other data streams are terminated. The first retransmissions for packets 1A, SA, and possibly other packets are sent in TTI $T_3$. Packet 1A is still decoded in error, and so on, and packet SA is decoded correctly. Data stream S is then blanked until all remaining HARQ processes terminate. The second retransmissions for packets 1A and possibly other packets are sent in TTI $T_5$. In this example, packet 1A and all pending packets are decoded correctly after the second retransmission, and their HARQ processes terminate in TTI $T_5$. S new HARQ processes are then started in TTI $T_7$ for S new packets 1B through SB. The first transmissions for these S new packets are sent in TTI $T_7$.

Figure 4B:
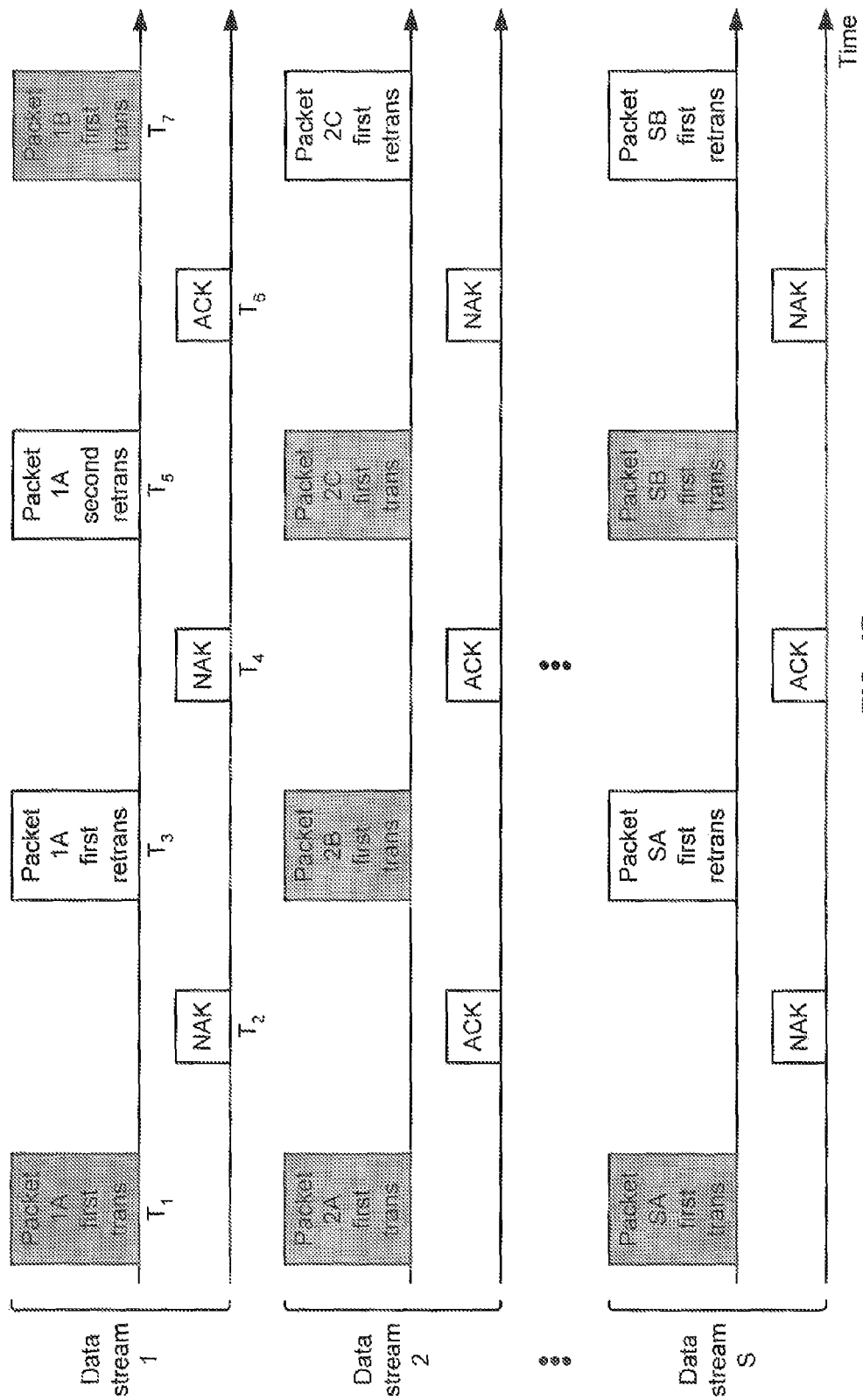
FIG. 4B shows HARQ transmission for multiple data streams without blanking.

FIG. 4B shows an example HARQ transmission for multiple (S>1) data streams without blanking, which is also referred to as non-blanking strategy. HARQ without blanking refers to a scheme that starts a new HARQ process immediately whenever a pending HARQ process terminates.

In the example shown in FIG. 4B, S HARQ processes are started in TTI $T_1$ for S packets 1A through SA, and the first transmissions for these S packets are sent in TTI $T_1$. Packet 1A is decoded in error, packet 2A is decoded correctly, and so on, and packet SA is decoded in error. A new HARQ process is started for packet 2B on data stream 2. The first retransmissions for packets 1A, SA, and possibly other packets as well as the first transmission for packet 2B are sent in TTI $T_3$. Packet 1A is still decoded in error, packet 2B is decoded correctly, and so on, and packet SA is also decoded correctly. A new HARQ process is started for packet 2C on data stream 2, and another new HARQ process is started for packet SB on data stream S. The second retransmissions for packets 1A and possibly other packets as well as the first transmissions for packets 2C and SB are sent in TTI $T_5$. Packet 1A is decoded correctly, packet 2C is decoded in error, and so on, and packet SB is also decoded in error. A new HARQ process is started for packet 1B on data stream 1. The transmission for packet 1B as well as the first retransmissions for packets 2C, SB, and possibly other packets are sent in TTI $T_7$.

As shown in FIGS. 4A and 4B, HARQ with blanking may have lower throughput in comparison to HARQ without blanking. This is because HARQ with blanking does not utilize all of the transmission resources when the HARQ processes for the S data streams have different termination times. However, HARQ with blanking may have some advantages such as simple user scheduling, simple HARQ management, more flexible rank selection, etc. Rank selection refers to the selection of a specific number of data streams to send based upon channel conditions. If the throughput loss due to blanking is small, then it may be desirable to use HARQ with blanking for MIMO transmission. In any case, it may be unavoidable to take the HARQ with blanking in the SU-MIMO transmission when a Node B scheduler desires to change one UE assigned to a given resource to another UE, keeping a single UE transmission.

The Node B may dynamically schedule the UEs in the SU-MIMO and MU-MIMO groups based upon various factors such as sector capacity (which may favor MU-MIMO), high peak throughput (which may favor SU-MIMO), data requirements, quality of service (QoS) requirements, sector loading, proportional fairness criterion, etc. For example, the Node B may schedule multiple UEs for MU-MIMO transmission, then a single UE for SU-MIMO transmission, then multiple UEs for MU-MIMO transmission, etc.

The dynamic scheduling of SU-MIMO UEs and MU-MIMO UEs may result in waste of transmission resources when HARQ is used for transmission. For a MU-MIMO transmission to multiple UEs, the HARQ processes for these UEs may terminate at different times. For a SU-MIMO transmission to a single UE, the HARQ processes for this UE may terminate close together or at different time depending on the MIMO detection technique employed by the UE. Discrepancy in the termination times of the HARQ processes may result in waste of transmission resources when switching between SU-MIMO and MU-MIMO. For example, when switching from MU-MIMO to SU-MIMO, the Node B should wait until the HARQ processes for all MU-MIMO UEs being served have terminated. The Node B may blank the transmission resources for each HARQ process that terminates early. Depending on the target number of retransmissions and the target PER, this waste of transmission resources may result in significant loss of throughput.

In an aspect, the transmission resources available for data transmission are allocated to the SU-MIMO and MU-MIMO groups. The resource allocation may be achieved in various manners depending on how the transmission resources are defined, e.g., with time, or with time and frequency. The resource allocation may also be based upon various criteria such as the number of UEs in each group, the data and QoS requirements of the UEs, etc. Several schemes for allocating transmission resources are described below. The UEs in each group are served using the transmission resources allocated to that group.

Figure 5:
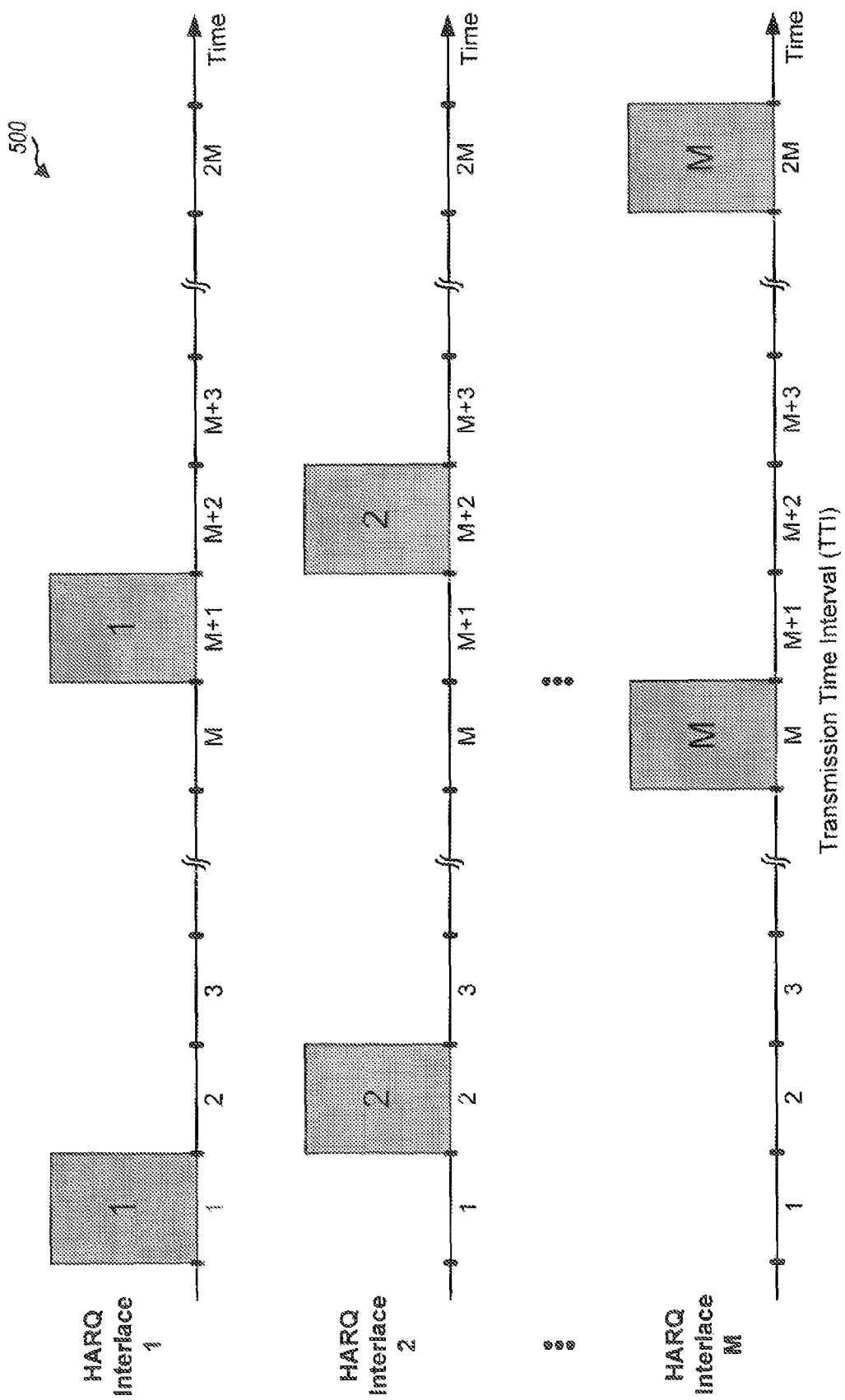
FIG. 5 shows an HARQ interlace structure.

FIG. 5 shows an HARQ interlace structure 500 that may be used for HARQ transmission. The transmission timeline may be partitioned into units of TTIs, which may be sequentially numbered. Each TTI may span any time duration, which may be fixed or configurable.

M HARQ interlaces may be defined, where M may be any value. For example, M may be equal to four, six, or some other value. Each HARQ interlace covers TTIs that are spaced apart by M TTIs (not counting time allocated for overhead). The M HARQ interlaces cover TTIs that are staggered from one another. For example, HARQ interlace 1 may cover TTIs 1, M+1, etc., HARQ interlace 2 may cover TTIs 2, M+2, etc., and so on, and HARQ interlace M may cover TTIs M, 2M, etc.

Each HARQ process may be sent on just one HARQ interlace and not across HARQ interlaces. A set of one or more HARQ processes may be active on each HARQ interlace in a given TTI, depending on the number of packets being sent simultaneously with MIMO. M different sets of HARQ processes may be sent on the M HARQ interlaces. The M sets may include the same or different numbers of HARQ processes.

The M HARQ interlaces may be considered as transmission resources that may be allocated to the SU-MIMO and MU-MIMO groups. In general, each group may be allocated any number of HARQ interlaces and any one of the M HARQ interlaces. Each HARQ interlace may be allocated to either the SU-MIMO or MU-MIMO group.

Figure 6:
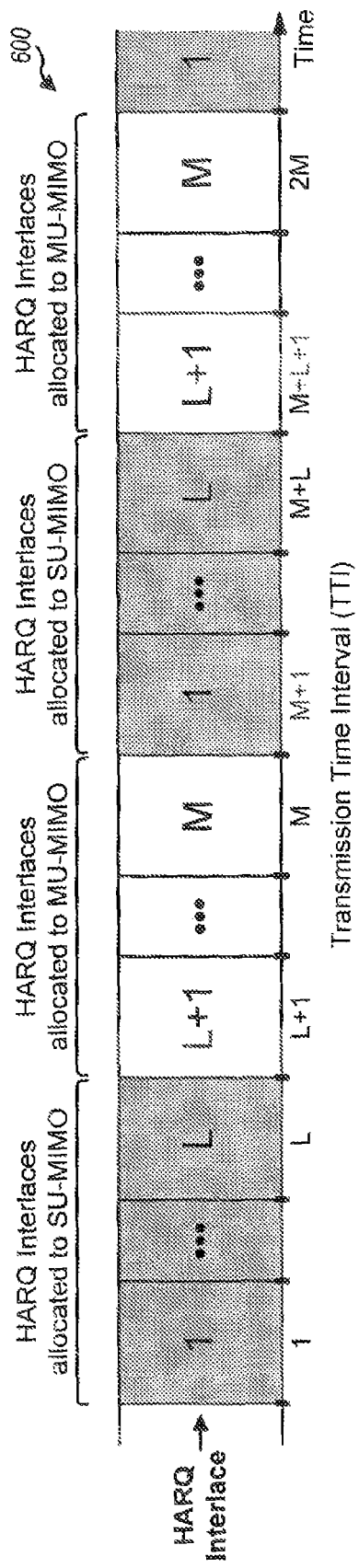
FIG. 6 shows allocation of HARQ interlaces to SU-MIMO and MU-MIMO.

FIG. 6 shows an example allocation of HARQ interlaces to the SU-MIMO and MU-MIMO groups. In this example, L HARQ interlaces 1 through L are allocated to the SU-MIMO group, and the remaining M-L HARQ interlaces L+1 through M are allocated to the MU-MIMO groups.

The UEs in the SU-MIMO group may be served using HARQ interlaces 1 through L. For example, HARQ interlace 1 may be used for one SU-MIMO UE, HARQ interlace 2 may be used for another SU-MIMO UE, and so on, and HARQ interlace L may be used for yet another SU-MIMO UE. More than one HARQ interlace may also be used for a given SU-MIMO UE. Up to L SU-MIMO UEs may be served with the L HARQ interlaces allocated to the SU-MIMO group. For a given HARQ interlace l, where $l \in \{1 \ldots L\}$, one or more HARQ processes may be active for the SU-MIMO UE assigned with HARQ interlace l. HARQ with blanking may be used for SU-MIMO, e.g., when the HARQ interlace is allocated to another UE. HARQ interlace l may be assigned to another SU-MIMO UE when all HARQ processes for the currently assigned UE have terminated.

The UEs in the MU-MIMO group may be served using HARQ interlaces L+1 through M. For example, HARQ interlace L+1 may be used for one set of MU-MIMO UEs. HARQ interlace L+2 may be used for another set of MU-MIMO UEs, and so on, and HARQ interlace M may be used for yet another set of MU-MIMO UEs. More than one HARQ interlace may also be used for a given MU-MIMO UE. Up to M-L sets of MU-MIMO UEs may be served with the M-L HARQ interlaces allocated to the MU-MIMO group. For a given HARQ interlace l, where $l \in \{L+1 \ldots M\}$, up to T HARQ processes may be active for the set of UEs assigned with HARQ interlace 1. HARQ without blanking may be used for MU-MIMO. Whenever an HARQ process terminates on HARQ interlace 1, another HARQ process may be started immediately for either (a) a UE currently assigned this HARQ interlace or (b) a new UE just assigned this HARQ interlace. Hence, transmission resources may be efficiently utilized for MU-MIMO.

The allocation of HARQ interlaces to the two groups and the use of the HARQ interlaces allocated to each group to serve the UEs in that group may improve resource utilization. By using each HARQ interlace for only one group, loss in throughput due to blanking when switching from MM-MIMO to SU-MIMO, and vice versa, can be avoided. The HARQ interlaces allocated to the MU-MIMO group may be efficiently utilized without blanking. HARQ processes for MU-MIMO may be synchronized only as needed for specific purposes, e.g., for resource reallocation, for scheduling, for switching between MU-MIMO UEs with different numbers of data streams, etc. Blanking may be used in MU-MIMO, e.g., if a scheduler cannot find any UE that can transmit data using the released resource without causing unacceptable interference. The HARQ interlaces allocated to the SU-MIMO group may also be efficiently utilized. Loss in throughput due to switching from one SU-MIMO UE to another SU-MIMO UE may be reduced by (a) persistently serving a SU-MIMO UE as long as possible to reduce the number/frequency of switches and (b) using techniques (e.g., SIC) that result in close termination times for the HARQ processes.

The system may utilize Orthogonal Frequency Division Multiplexing (OFDM), Single-Carrier Frequency Division Multiplexing (SC-FDM), or some other multi-carrier modulation techniques. OFDM and SC-FDM partition the system bandwidth into multiple (K) orthogonal subcarriers, which are also called tones, bins, and so on. K may be any integer value. Each subcarrier may be modulated with data. In general, modulation symbols are sent in the frequency domain with OFDM and in the time domain with SC-FDM. With multiple subcarriers, the transmission resources may be quantified by both time and frequency.

Figure 7A:
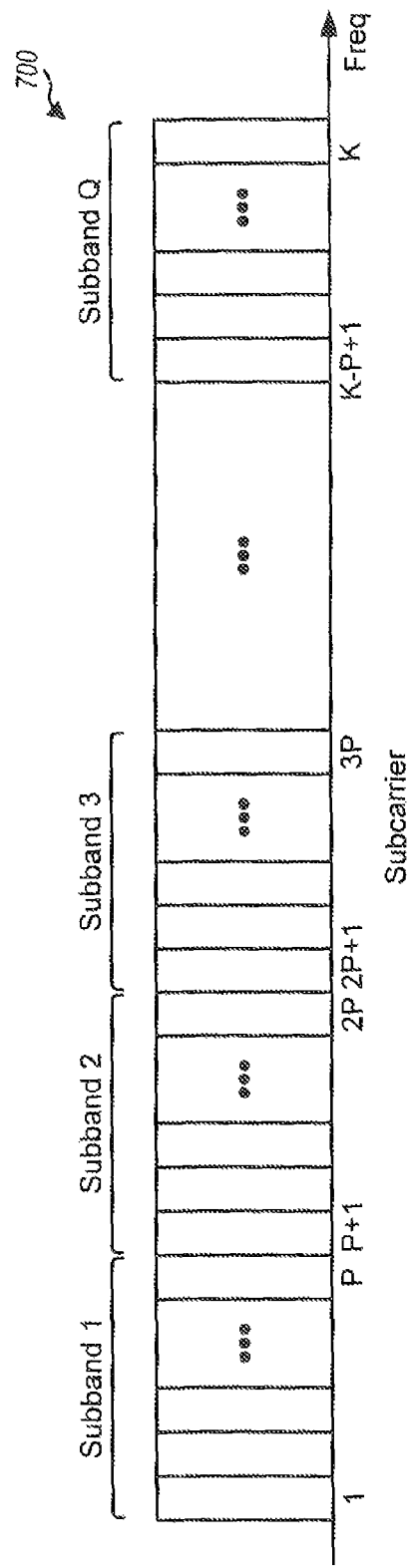
FIGS. 7A and 7B show two subcarrier structures.

FIG. 7A shows a subcarrier structure 700 that may be used for data transmission. The K total subcarriers are assigned indices of 1 through K. For simplicity, the following description assumes that all K total subcarriers are usable for transmission. For subcarrier structure 700, the K total subcarriers are arranged into Q subbands, where Q may be any value. Each subband includes P consecutive subcarriers, where K=P·Q. Thus, subband 1 includes subcarriers 1 through P, subband 2 includes subcarriers P+1 through 2P, and so on, and subband Q includes subcarriers K−P+1 through K.

Figure 7B:
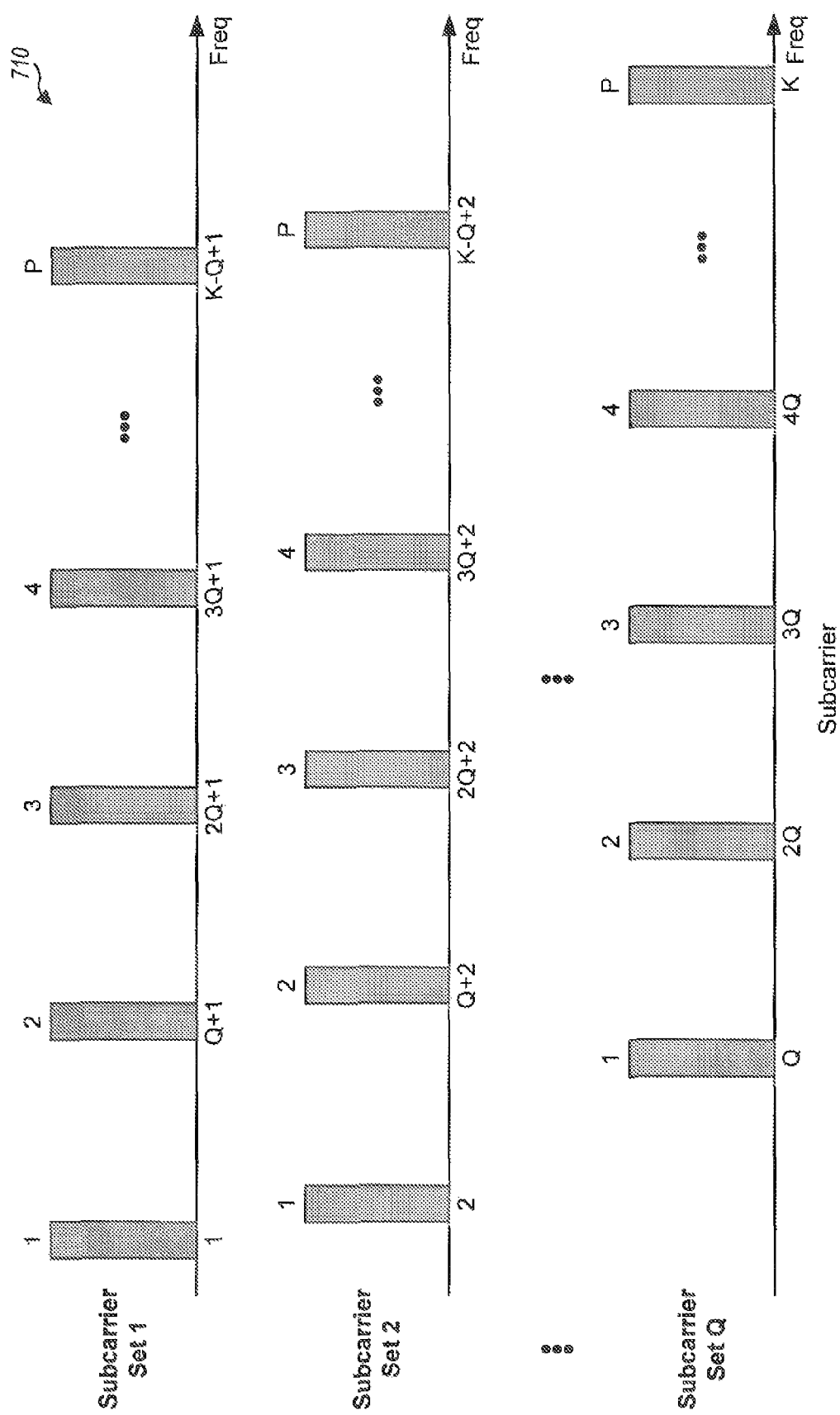

FIG. 7B shows a subcarrier structure 710 that may also be used for data transmission. For subcarrier structure 710, the K total subcarriers are arranged into Q sets. Each set includes P subcarriers that are uniformly distributed across the K total subcarriers, and consecutive subcarriers in each set are spaced apart by Q subcarriers. Set q, for q∈{1 . . . Q}, includes subcarriers q, Q+q, 2Q+q, etc.

Q frequency channels may be formed with the Q subbands in FIG. 7A, the Q subcarrier sets in FIG. 7B, or some other grouping of subcarriers. Each frequency channel may correspond to one subband, one subcarrier set, or one subcarrier group.

Figure 8:
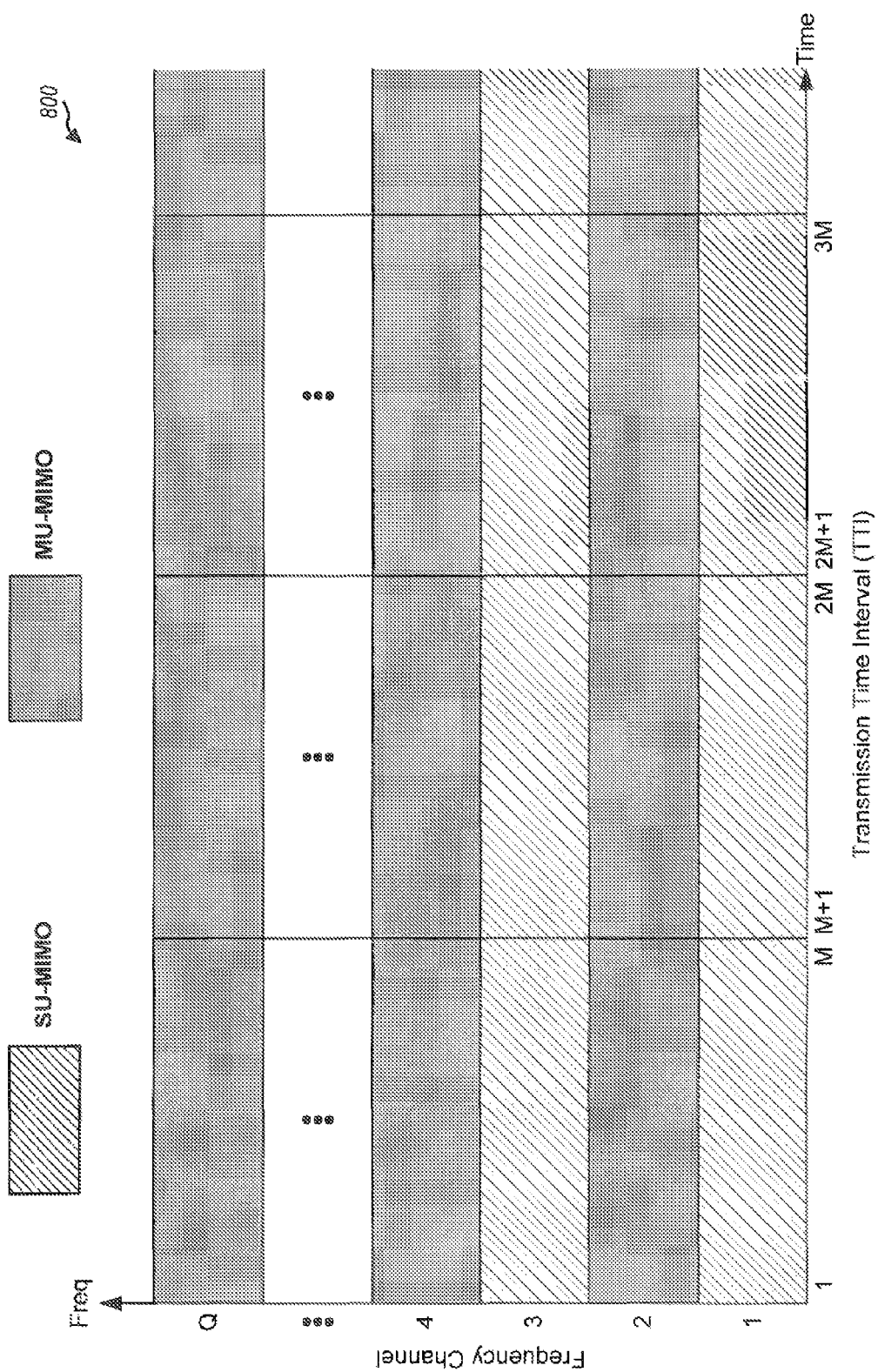
FIG. 8 shows resource allocation across frequency.

FIG. 8 shows an example of resource allocation across frequency. In this example, the Q frequency channels are allocated to the SU-MIMO and MU-MIMO groups, with each frequency channel being allocated to one group. In the example shown in FIG. 8, frequency channels 1, 3, etc. are allocated to the SU-MIMO group, and frequency channels 2, 4, etc., and Q are allocated to the MU-MIMO group. In general, each group may be allocated any number of frequency channels and any one of the Q frequency channels.

In one design, M HARQ interlaces are defined for each frequency channel. The M HARQ interlaces for each frequency channel may be used for the UEs in the group allocated that frequency channel. In this design, the number of HARQ interlaces available for each group is dependent on the number of frequency channels allocated to the group.

In another design, M HARQ interlaces are defined for all frequency channels allocated to each group. Each group has M HARQ interlaces, with the capacity of each HARQ interlace being dependent on the number of frequency channels allocated to the group. The M HARQ interlaces for each group may be used for the UEs in the group.

In general, any number of HARQ interlaces may be defined for each group based upon the frequency channels allocated to that group. Each HARQ interlace may cover one or more frequency channels. The UEs in each group may be served using the HARQ interlaces available for that group.

Resource allocation may also be performed across time and frequency. In one design, M HARQ interlaces are defined for each frequency channel, and a total of M·Q HARQ interlaces are available. Each of the M·Q HARQ interlaces may be allocated to the SU-MIMO or MU-MIMO group. This design provides fine granularity and flexibility in allocating transmission resources to the groups. In another design, multiple sets of frequency channels are formed, M HARQ interlaces are defined for each set of frequency channels, and each HARQ interlace may be allocated to SU-MIMO or MU-MIMO group. The sets may include the same number of frequency channels, in which case the HARQ interlaces have equal capacity. Alternatively, the sets may include different numbers of frequency channels, in which case the HARQ interlaces have different capacities.

The available transmission resources may be allocated to the SU-MIMO and MU-MIMO groups based upon various criteria. The resource allocation may be based upon the number of UEs in each group. More transmission resources may be allocated to the SU-MIMO (or MU-MIMO) group when more SU-MIMO (or MU-MIMO) UEs are present. The resource allocation may also be based upon the data requirements of the UEs. For example, the total loading (or total required throughput) for all SU-MIMO UEs and the total loading for all MU-MIMO UEs may be determined, and transmission resources may be allocated based upon the total loadings for the two groups. The resource allocation may also be based upon quality of service (QoS) and/or other requirements of the UEs. The resource allocation may also be based upon other criteria.

The resource allocation may be semi-static and may change infrequently, if at all. The Node B may evaluate operating conditions periodically and may reallocate transmission resources to the SU-MIMO and MU-MIMO groups as necessary. The resource allocation may be performed whenever the groups are updated or may be performed independent of any group update.

The scheduler for the Node B may schedule UEs for transmission based upon the data and QoS requirements of the UEs and their feedback information. Each UE may be informed of the transmission resources (e.g., HARQ interlace) used for that UE at the time of scheduling, at the start of a call, and/or at other time. For example, in each scheduling interval, signaling may be sent to convey which UEs are scheduled for transmission and the HARQ interlace(s) used for each scheduled UE.

A SU-MIMO UE may perform MMSE detection with SIC (or MMSE-SIC) to recover the MIMO transmission sent to the UE. For MMSE-SIC, the UE initially performs MMSE detection on the received symbols from the R receive antennas at the UE to obtain data symbol estimates for one packet sent in one HARQ process. The UE then processes (e.g., demodulates, deinterleaves, and decodes) the data symbol estimates to obtain a decoded packet. If the packet is decoded correctly, then the UE estimates the interference caused by this packet and subtracts the estimated interference from the received symbols. The UE then performs MMSE detection on the interference-canceled symbols to obtain data symbol estimates for another packet sent in another HARQ process. The UE then processes the new data symbol estimates to obtain another decoded packet.

The Node B may concurrently send S packets on S data streams to the SU-MIMO UE. The UE may perform MMSE detection, decoding, and interference cancellation for each packet sent to the UE. When SIC is employed, the data streams are also referred to as layers. The first data stream to be recovered is referred to as the lowest layer stream, and the last data stream to be recovered is referred to as the highest layer stream.

When a SU-MIMO UE uses MMSE-SIC, all of the HARQ processes for the UE are likely to terminate at the same time. The rates for the data streams may be sequentially selected such that higher layer streams can be decoded correctly only when lower layer streams are decoded correctly and canceled. A control loop may be used to achieve similar PER for all data streams. In this case, the higher layer streams may be decoded correctly as soon as the lower layer streams are decoded correctly and canceled. As a result, all of the HARQ processes terminate in the same TTI in most cases. Furthermore, the rate or backoff margin for each data stream may be selected such that the HARQ processes for all data streams terminate at the same time with high probability. Blanking may be used to synchronize the HARQ processes whenever all data streams are not decoded correctly at the same time, which may be infrequent. Close termination of the HARQ processes may also be obtained when other MIMO detection techniques (e.g., zero-forcing) are used in combination with SIC.

A SU-MIMO UE may also perform MMSE detection without SIC. In this case, the rates of the data streams may be selected independently based upon the SNRs of these streams. The HARQ processes for these data streams may terminate at different times.

Computer simulations were performed to determine the throughput of SU-MIMO UEs for four cases corresponding to different combinations of (a) MMSE or MMSE-SIC and (b) HARQ with blanking or HARQ without blanking. The simulations indicate that MMSE-SIC with blanking and MMSE-SIC without blanking have the best performance and are similar in performance. MMSE without blanking has the next best performance, and MMSE with blanking has the worst performance.

To reduce loss in throughput due to blanking, the UEs may be classified into groups based upon the likelihood of their HARQ processes terminating at the same time or close together. UEs employing SIC and/or other techniques that can result in close termination of their HARQ processes may be placed in the SU-MIMO group. UEs with HARQ processes terminating at different times may be placed in the MU-MIMO group.

HARQ with blanking may be used for the SU-MIMO group. A MIMO transmission is sent to one UE at a time from the SU-MIMO group. A new MIMO transmission may be sent to another UE when all of the HARQ processes for the current UE have terminated.

HARQ without blanking may be used for the MU-MIMO group. A MIMO transmission may be sent to one or multiple UEs at a time from the MU-MIMO group A new HARQ process may be started as soon as a pending HARQ process terminates. A MIMO transmission may be sent to a single UE in the MU-MIMO group. The HARQ processes for this single UE may start at different times depending on when the prior HARQ processes terminate. Furthermore, new HARQ processes may be started whenever the HARQ processes for this single UE terminate. The HARQ processes for this single UE may thus overlap the HARQ processes for other UEs at the start and/or tail of the MIMO transmission to this single UE. This single UE may be considered as a MU-MIMO UE because of the overlap at the start and/or tail of the transmission to this UE.

FIG. 9 shows a process 900 for allocating transmission resources to users/UEs. Process 900 may be performed by a Node B, a scheduler, and/or some other network entity. Users are classified into a plurality of groups comprising a first group and a second group (block 912). The first group may include users to be scheduled individually for MIMO transmission, or SU-MIMO users. The second group may include users that can be scheduled together for MIMO transmission, or MU-MIMO users. The classification may be semi-static and may be based upon various criteria, as described above.

Transmission resources are allocated to the first and second groups (block 914). The transmission resources may comprise HARQ interlaces, and each group may be allocated at least one HARQ interlace. The transmission resources may comprise frequency channels, and each group may be allocated at least one frequency channel The transmission resources may also comprise time frequency resources. The resource allocation may be based upon the number of users in each group, data requirements of the users in each group, total loading of the users, interference associated with the users, etc., or any combination thereof. The resource allocation may be semi-static. Information on the transmission resources allocated to each group may be conveyed to each UE in that group by higher layer signaling, a broadcast channel, etc. This information may be used by each UE to facilitate feedback of CQI, precoding matrices and vectors, preferred subband information, etc. from the UE. The transmission resources may be reallocated, e.g., if the number of users in the first and/or second group exceeds a threshold.

The transmission resources allocated to each group are used for data transmission for the users in the group (block 916). The transmission resources may be used for downlink and/or uplink transmission. For the downlink, MIMO transmission may be sent to one user in the first group at a time using the transmission resources allocated to the first group. MIMO transmission may be sent to multiple users in the second group at a time using the transmission resources allocated to the second group. HARQ with blanking may be used for data transmission for the SU-MIMO users in the first group (block 918). HARQ without blanking may be used for data transmission for the MU-MIMO users in the second group (block 920).

FIG. 10 shows an apparatus 1000 for allocating transmission resources to users. Apparatus 1000 includes means for classifying users into a plurality of groups comprising a first group of SU-MIMO users and a second group of MU-MIMO users (module 1012), means for allocating transmission resources to the first and second groups (module 1014), means for using the transmission resources allocated to each group for data transmission for the users in the group (block 1016), means for using HARQ with blanking for data transmission for the SU-MIMO users in the first group (module 1018), and means for using HARQ without blanking for data transmission for the MU-MIMO users in the second group (module 1020). Modules 1012 to 1020 may comprise processors, electronics devices, hardware devices, electronics components, logical circuits, memories, etc., or any combination thereof.

Figures 11, 12:
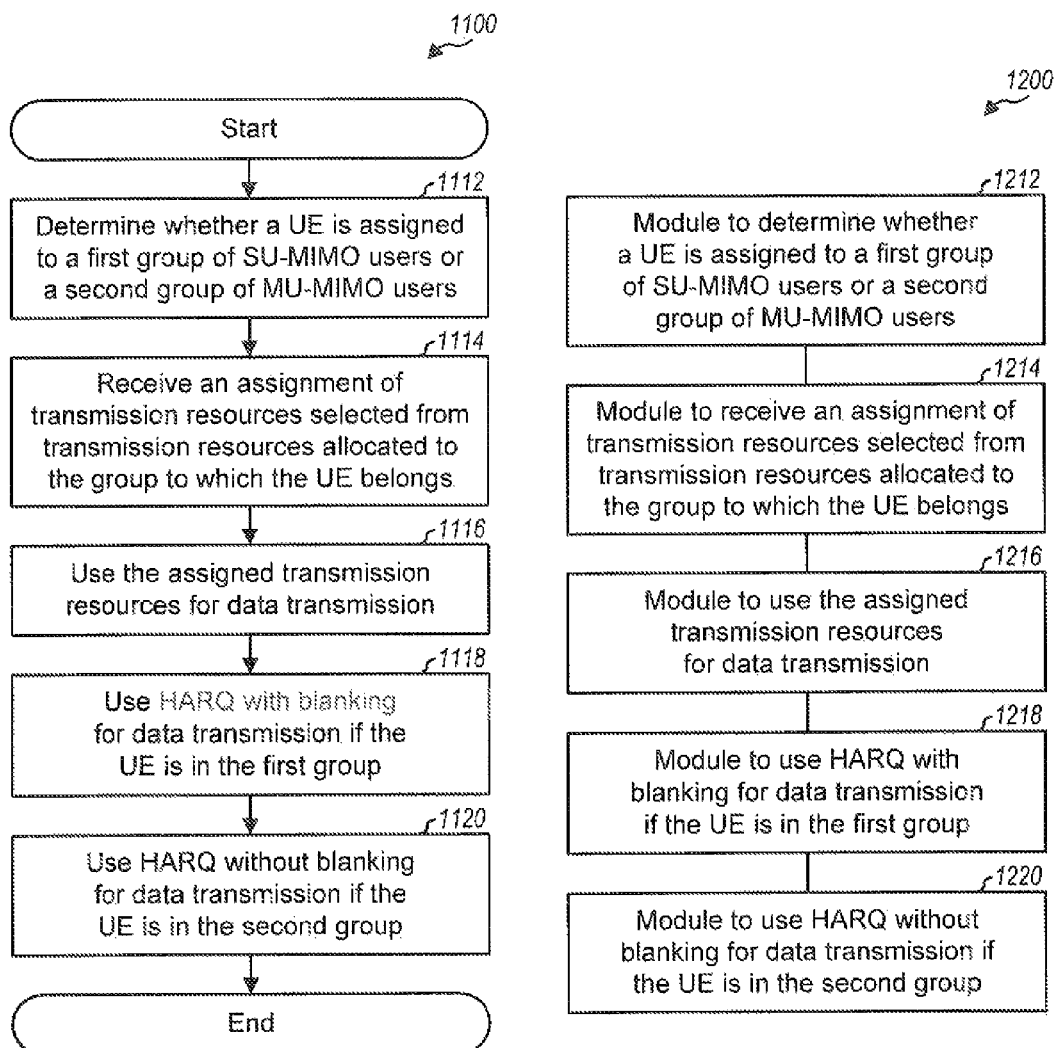
FIG. 11 shows a process performed for a user for data transmission.
FIG. 12 shows an apparatus for data transmission.

FIG. 11 shows a process 1100 performed for a user (by a UE or a Node B) for data transmission. A determination is made whether the UE is assigned to a first group of users to be scheduled individually for MIMO transmission or a second group of users that can be scheduled together for MIMO transmission (block 1112). An assignment of transmission resources for data transmission is received (block 1114). The assigned transmission resources are selected from the transmission resources allocated to the group to which the UE belongs. The assigned transmission resources may comprise at least one HARQ interlace, at least one frequency channel, etc. The assigned transmission resources are used for data transmission on the downlink and/or uplink (block 1116). The HARQ with blanking may be used for data transmission if the UE is in the first group (block 1118) and HARQ without blanking may be used for data transmission if the UE is in the second group (block 1120).

FIG. 12 shows an apparatus 1200 at a UE or a Node B for data transmission for a user. Apparatus 1200 includes means for determining whether the UE is assigned to a first group of SU-MIMO users or a second group of MU-MIMO users (module 1212), means for receiving an assignment of transmission resources for data transmission (module 1214), means for using the assigned transmission resources for data transmission on the downlink and/or uplink (module 1216), means for using HARQ with blanking for data transmission if the UE is in the first group (module 1218), and means for using HARQ without blanking for data transmission if the UE is in the second group (module 1220). Modules 1212 to 1220 may comprise processors, electronics devices, hardware devices, electronics components, logical circuits, memories, etc., or any combination thereof.

Referring back to FIG. 2, controller/processor 240 and/or scheduler 244 may classify UEs into SU-MIMO and MU-MIMO groups and may allocate transmission resources to these groups for downlink and/or uplink transmission. The resource allocation for the downlink may be the same as, or different from, the resource allocation for the uplink. Controller/processor 240 and/or scheduler 244 may also schedule UEs for data transmission on the downlink and/or uplink and may assign transmission resources to the scheduled UEs. Controller/processor 240 and/or scheduler 244 may perform process 900 and/or other processes for UE classification, resource allocation, scheduling, and transmission. Controller/processor 280 at each UE may perform process 1100 and/or other processes for data transmission on the downlink and/or uplink.

The techniques described herein may be implemented by various means. For example, these techniques may be implemented in hardware, firmware, software, or a combination thereof. For a hardware implementation, the processing units at a Node B or a UE may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 242, 282x or 282y in FIG. 2) and executed by a processor (e.g., processor 240, 280x or 280y). The memory may be implemented within the processor or external to the processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus comprising:
at least one processor configured to allocate transmission resources to first and second groups of users, the first group including users to be scheduled individually for multiple-input multiple-output (MIMO) transmission, the second group including users that can be scheduled together for MIMO transmission, and to use the transmission resources allocated to each group for data transmission for the users in the group, wherein the first group is a single-user MIMO (SU-MIMO) group and the second group is a multi-user MIMO (MU-MIMO) group, and wherein the processor is further configured to use hybrid automatic retransmission (HARQ) with blanking for data transmission for the users in the first group and to use HARQ without blanking for data transmission for the users in the second group; and
a memory coupled to the processor.

2. The apparatus of claim 1, wherein the processor is configured to classify users into a plurality of groups comprising the first and second groups.

3. The apparatus of claim 1, wherein the processor is configured to blank transmission when changing scheduled users in the first group.

4. The apparatus of claim 1, wherein the transmission resources comprise a plurality of hybrid automatic retransmission (HARQ) interlaces, and wherein the processor is configured to allocate at least one of the plurality of HARQ interlaces to each of the first and second groups, and to use the at least one HARQ interlace allocated to each group for data transmission for the users in the group.

5. The apparatus of claim 1, wherein the transmission resources comprises a plurality of frequency channels, and wherein the processor is configured to allocate at least one of the plurality of frequency channels to each of the first and second groups, and to use the at least one frequency channel allocated to each group for data transmission for the users in the group.

6. The apparatus of claim 1, wherein the transmission resources comprises time frequency resources, and wherein the processor is configured to allocate the time frequency resources to the first and second groups, and to use the time frequency resources allocated to each group for data transmission for the users in the group.

7. The apparatus of claim 1, wherein the processor is configured to allocate the transmission resources to the first and second groups based upon number of users in each group.

8. The apparatus of claim 7, wherein the processor is configured to reallocate the transmission resources to the first and second groups if the number of users in the first or second group exceeds a threshold.

9. The apparatus of claim 7, wherein the processor is configured to reallocate the transmission resources to the first and second groups if the number of users in the first group and the number of users in the second group both exceed a threshold.

10. The apparatus of claim 1, wherein the processor is configured to allocate the transmission resources to the first and second groups based upon data requirements of the users in each group.

11. The apparatus of claim 1, wherein the processor is configured to allocate the transmission resources to the first and second groups based upon total loading of the users in the first group and total loading of the users in the second group.

12. The apparatus of claim 1, wherein the allocation of transmission resources to the first and second groups is semi-static.

13. The apparatus of claim 1, wherein the processor is configured to convey to each user in the first group information of transmission resources allocated to the first group of users, and to convey to each user in the second group information of transmission resources allocated to the second group of users.

14. The apparatus of claim 1, wherein the processor is configured to transmit data to the users in each group using the transmission resources allocated to the group.

15. The apparatus of claim 1, wherein the processor is configured to receive data from the users in each group via the transmission resources allocated to the group.

16. The apparatus of claim 1, wherein the processor is configured to send MIMO transmission to one user in the first group at a time using the transmission resources allocated to the first group, and to send MIMO transmission to multiple users in the second group at a time using the transmission resources allocated to the second group.

17. A method comprising:
allocating transmission resources to first and second groups of users, the first group including users to be scheduled individually for multiple-input multiple-output (MIMO) transmission, the second group including users that can be scheduled together for MIMO transmission, wherein the first group is a single-user MIMO (SU-MIMO) group and the second group is a multi-user MIMO (MU-MIMO) group;
using the transmission resources allocated to each group for data transmission for the users in the group; and
using hybrid automatic retransmission (HARQ) with blanking for data transmission for the users in the first group, and using HARQ without blanking for data transmission for the users in the second group.

18. The method of claim 17, wherein the transmission resources comprise a plurality of hybrid automatic retransmission (HARQ) interlaces, wherein the allocating the transmission resources comprises allocating at least one of the plurality of HARQ interlaces to each of the first and second groups, and wherein the using the transmission resources comprises using the at least one HARQ interlace allocated to each group for data transmission for the users in the group.

19. The method of claim 17, wherein the allocating the transmission resources comprises allocating the transmission resources to the first and second groups based upon number of users in each group, data requirements of the users in each group, total loading of the users in each group, or a combination thereof.

20. An apparatus comprising:
means for allocating transmission resources to first and second groups of users, the first group including users to be scheduled individually for multiple-input multiple-output (MIMO) transmission, the second group including users that can be scheduled together for MIMO transmission, wherein the first group is a single-user MIMO (SU-MIMO) group and the second group is a multi-user MIMO (MU-MIMO) group;
means for using the transmission resources allocated to each group for data transmission for the users in the group; and
means for using hybrid automatic retransmission (HARQ) with blanking for data transmission for the users in the first group and means for using HARQ without blanking for data transmission for the users in the second group.

21. The apparatus of claim 20, wherein the transmission resources comprise a plurality of hybrid automatic retransmission (HARQ) interlaces, wherein the means for allocating the transmission resources comprises means for allocating at least one of the plurality of HARQ interlaces to each of the first and second groups, and wherein the means for using the transmission resources comprises means for using the at least one HARQ interlace allocated to each group for data transmission for the users in the group.

22. The apparatus of claim 20, wherein the means for allocating the transmission resources comprises means for allocating the transmission resources to the first and second groups based upon number of users in each group, data requirements of the users in each group, total loading of the users in each group, or a combination thereof.

23. A non-transitory computer-readable medium including instructions stored thereon, comprising:
a first instruction set for allocating transmission resources to first and second groups of users, the first group including users to be scheduled individually for multiple-input multiple-output (MIMO) transmission, the second group including users that can be scheduled together for MIMO transmission, wherein the first group is a single-user MIMO (SU-MIMO) group and the second group is a multi-user MIMO (MU-MIMO) group;
a second instruction set for using the transmission resources allocated to each group for data transmission for the users in the group; and
a third instruction set for using hybrid automatic retransmission (HARQ) with blanking for data transmission for the users in the first group; and
a fourth instruction set for using HARQ without blanking for data transmission for the users in the second group.

24. An apparatus comprising:
a processor configured to receive an assignment of transmission resources for a user equipment (UE) selected from transmission resources allocated to a first group or a second group, the first group including user equipments (UEs) to be scheduled individually for multiple-input multiple-output (MIMO) transmission, the second group including UEs that can be scheduled together for MIMO transmission, wherein the first group is a single-user MIMO (SU-MIMO) group and the second group is a multi-user MIMO (MU-MIMO) group, to use the assigned transmission resources for data transmission, and to use hybrid automatic retransmission (HARQ) with blanking for data transmission if the UE is in the first group and to use HARQ without blanking for data transmission if the UE is in the second group; and
a memory coupled to the processor.

25. The apparatus of claim 24, wherein the processor is configured to determine whether the UE is assigned to the first group or the second group, and wherein the assigned transmission resources are selected from the transmission resources allocated to the group to which the UE is assigned.

26. The apparatus of claim 24, wherein the assigned transmission resources comprise at least one hybrid automatic retransmission (HARQ) interlace selected from a plurality of HARQ interlaces allocated to the group to which the UE is assigned.

27. The apparatus of claim 24, wherein the assigned transmission resources comprise at least one frequency channel selected from a plurality of frequency channels allocated to the group to which the UE is assigned.

28. The apparatus of claim 24, wherein the processor is configured to determine feedback information based on the assignment of transmission resources, and to send the feedback information.

29. A method comprising:
receiving an assignment of transmission resources for a user equipment (UE) selected from transmission resources allocated to a first group or a second group, the first group including UEs to be scheduled individually for multiple-input multiple-output (MIMO) transmission, the second group including UEs that can be scheduled together for MIMO transmission, wherein the first group is a single-user MIMO (SU-MIMO) group and the second group is a multi-user MIMO (MU-MIMO) group;
using the assigned transmission resources for data transmission; and
using hybrid automatic retransmission (HARQ) with blanking for the data transmission if the UE is in the first group, and using HARQ without blanking for data transmission if the UE is in the second group.

30. The method of claim 29, wherein the receiving an assignment of transmission resources comprises receiving an assignment of at least one hybrid automatic retransmission (HARQ) interlace selected from a plurality of HARQ interlaces allocated to the group to which the UE is assigned.

31. An apparatus comprising:
means for receiving an assignment of transmission resources for a user equipment (UE) selected from transmission resources allocated to a first group or a second group, the first group including UEs to be scheduled individually for multiple-input multiple-output (MIMO) transmission, the second group including UEs that can be scheduled together for MIMO transmission, wherein the first group is a single-user MIMO (SU-MIMO) group and the second group is a multi-user MIMO (MU-MIMO) group;
means for using the assigned transmission resources for data transmission; and
means for using hybrid automatic retransmission (HARQ) with blanking for data transmission if the UE is in the first group and means for using HARQ without blanking for data transmission if the UE is in the second group.

32. The apparatus of claim 31, wherein the means for receiving an assignment of transmission resources comprises means for receiving an assignment of at least one hybrid automatic retransmission (HARQ) interlace selected from a plurality of HARQ interlaces allocated to the group to which the UE is assigned.

* * * * *